US008670759B2

(12) United States Patent
Shinada

(10) Patent No.: US 8,670,759 B2
(45) Date of Patent: Mar. 11, 2014

(54) COMMUNICATION SYSTEM

(75) Inventor: Satoru Shinada, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 12/999,977

(22) PCT Filed: Jun. 26, 2009

(86) PCT No.: PCT/JP2009/062171
§ 371 (c)(1),
(2), (4) Date: Dec. 17, 2010

(87) PCT Pub. No.: WO2010/001983
PCT Pub. Date: Jan. 7, 2010

(65) Prior Publication Data

US 2011/0189990 A1 Aug. 4, 2011

(30) Foreign Application Priority Data

Jul. 3, 2008 (JP) ................................ 2008-174275

(51) Int. Cl.
*H04W 4/00* (2009.01)
*H04B 5/00* (2006.01)

(52) U.S. Cl.
USPC ...................................... 455/426.1; 455/41.1

(58) Field of Classification Search
USPC ................. 455/426.1, 41.1, 41.2, 15, 20, 22, 455/456.2, 16, 11.1
See application file for complete search history.

(56) References Cited

U.S. PATENT DOCUMENTS 7,336,927 B2 * 2/2008 Cervera et al. .............. 455/41.2
8,111,675 B2 * 2/2012 Kim et al. .................... 370/338
2006/0019655 A1 * 1/2006 Peacock .................... 455/426.1
2006/0046645 A1 * 3/2006 Ogilvie ........................ 455/11.1
2006/0178161 A1 * 8/2006 Jung ............................ 455/518
2006/0205408 A1 * 9/2006 Nakagawa et al. .......... 455/445
2007/0287474 A1 * 12/2007 Jenkins et al. ............ 455/456.2
2008/0090595 A1 * 4/2008 Liu et al. ...................... 455/461

FOREIGN PATENT DOCUMENTS

JP 2001-244928 A 9/2001
JP 2004-363998 A 12/2004
JP 2005-101716 A 4/2005
JP 2007-259499 A 10/2007
JP 2008-522510 A 6/2008

OTHER PUBLICATIONS

International Search Report for PCT/JP2009/062171 mailed Aug. 25, 2009.

* cited by examiner

*Primary Examiner* — Andrew Wendell
*Assistant Examiner* — Maryam Soltanzadeh
(74) *Attorney, Agent, or Firm* — Sughrue Mion, PLLC

(57) ABSTRACT

A communication system, which makes possible to carry out wide area communication between terminals, includes a mobile communication terminal which has a mobile communication means to carryout communication via a mobile communication network and a near field wireless communication means to carry out communication via a near field wireless communication network, and a near field wireless communication terminal which has a near field communication means to carry out communication via the near field communication network. Moreover, the mobile communication terminal comprises a communication repeating means to connect, as a repeater, other mobile communication terminal which is connected to the mobile communication terminal via the mobile communication network, and the near field wireless communication terminal which is connected to the mobile communication terminal via the near field communication network, by use of a communication path between the mobile communication terminal and the other mobile communication terminal.

5 Claims, 5 Drawing Sheets

COMMUNICATION SYSTEM

This application is the National Phase of PCT/JP2009/062171, filed Jun. 26, 2009, which is based upon and claims the benefit of priority from Japanese Patent Application No. 2008-174275, filed on Jul. 3, 2008, the disclosure of which is incorporated herein in their entirety by reference.

TECHNICAL FIELD

The present invention relates to a communication system and in particular, relates to a communication system which enables a communication terminal, which can carry out near field wireless communication, to carry out wide area communication.

BACKGROUND ART

Recently, some portable device has a function to carry out mutual communication easily not via other device. For example, a portable device with the wireless LAN function is widely prevailing. Moreover, it becomes possible to set up an ad hoc network which does not require any access point for a plurality of portable devices. Then, it is possible to exchange data in a near field by many users, each of whom holds a portable device, gathering in the near field.

However, there is a restriction that, in order to set up an ad hoc network, each of devices must exist nearby each other to some extent so that the devices may communicate each other. Moreover, there is another restriction that it is impossible to carry out complicated setting, for example setting for enabling to carryout communication within a group, which is composed of a plurality of people, in a general environment like the internet.

On the other hand, a cellular phone has really little restriction in the communication distance since the cellular phone communicates via a communication base station. Moreover, communication within a group has been already realized as PTT (Push To Talk). While the current PTT function is used for a voice call, actual signals which are sent and received by the cellular phone are digital data which are packet data converted from the voice signal. Therefore, it is easy to carry out data communication by use of the current PTT function. However, since the cellular phone has not a specialized function, for example an advanced data communication function and an advanced data processing function differently from the portable device mentioned above, the cellular phone has limitation in its use.

Here, Japanese Patent Application Laid-Open No. 2004-363998, Japanese Patent Application Laid-Open No. 2005-101716 and Japanese Patent Application Laid-Open No. 2007-259499 disclose an art to enable to carry out communication between communication devices whose communication forms are different each other. Specifically, the system according to the art includes a first wireless communication device which has a function to connect to a mobile communication network, and a second wireless communication device which has not the function to connect to the mobile communication network and has a function to connect to a fixed communication network such as LAN. Moreover, these wireless communication devices set up an ad hoc network each other. That is, each of the wireless communication devices within the ad hoc network has an ad hoc communication function which enables the wireless communication device to communicate each other. In particular, a communication method used in the ad hoc network is the same as one used in the mobile communication network mentioned above.

DISCLOSURE OF THE INVENTION

According to the art disclosed in Japanese Patent Application Laid-Open No. 2004-363998, Japanese Patent Application Laid-Open No. 2005-101716 and Japanese Patent Application Laid-Open No. 2007-259499 mentioned above, both terminals are equipped with the same communication function which makes possible the communication method used in the mobile communication network. Therefore, the communication function becomes unnecessary in the case that a terminal does not carryout said communication and carries out only near field wireless communication such as LAN. Moreover, it is necessary that the second wireless communication device switches communication state on the basis of the terminal which is aimed to be connected, and consequently, a problem that processes carried out by the second wireless communication device become complicated is caused.

For this reason, an object of the present invention is to make it possible to carry out wide area communication between terminals by use of a simple configuration in order to solve the problem mentioned above.

A communication system, which is an exemplary embodiment of the present invention to achieve the object, is characterized in that the communication system comprises a mobile communication terminal which has a mobile communication means for carrying out communication via a mobile communication network and a near field wireless communication means for carrying out communication via a near field wireless communication network, and a near field wireless communication terminal which has a near field communication means for carrying out communication via the near field communication network, and the mobile communication terminal comprises a communication repeating means for connecting, as a repeater, other mobile communication terminal which is connected to the mobile communication terminal via the mobile communication network, and the near field wireless communication terminal which is connected to the mobile communication terminal via the near field communication network, by use of a communication path between the mobile communication terminal and the other mobile communication terminal.

A mobile communication terminal, which is another exemplary embodiment of the present invention, is characterized by comprising a mobile communication means for carrying out communication via a mobile communication network and a near field wireless communication means for carrying out communication via a near field wireless communication, and a communication repeating means for connecting, as a repeater, other mobile communication terminal and a near field wireless communication terminal which is connected via the near field communication network, by use of a communication path which is connected to said other mobile communication terminal via said mobile communication network.

A program, which is another exemplary embodiment of the present invention, makes a computer of a mobile communication terminal, which comprises a mobile communication means for carrying out communication via a mobile communication network and a near field wireless communication means for carrying out communication via a near field wireless communication network, execute a communication repeating procedure for connecting, as a repeating procedure, other mobile communication terminal and a near field wireless communication terminal which is connected via the near field communication network, by use of a communication path which is connected to said other mobile communication terminal via said mobile communication network.

A communication method, which is another exemplary embodiment of the present invention, is characterized in that a mobile communication terminal, which includes a mobile communication means for carrying out communication via a mobile communication network, and a near field wireless communication means for carrying out communication via a near field wireless communication network, the method comprising the step of carrying out a communication repeating process for connecting, as a repeating process, other mobile communication terminal and a near field wireless communication terminal which is connected via the near field communication network, by use of a communication path which is connected to said other mobile communication terminal via said mobile communication network.

By virtue of the above-mentioned configuration according to the present invention, it is possible to realize wide area communication by use of the near field wireless communication terminal with the simple configuration and low cost.

THE BEST MODE FOR CARRYING OUT THE INVENTION

Figure 1:
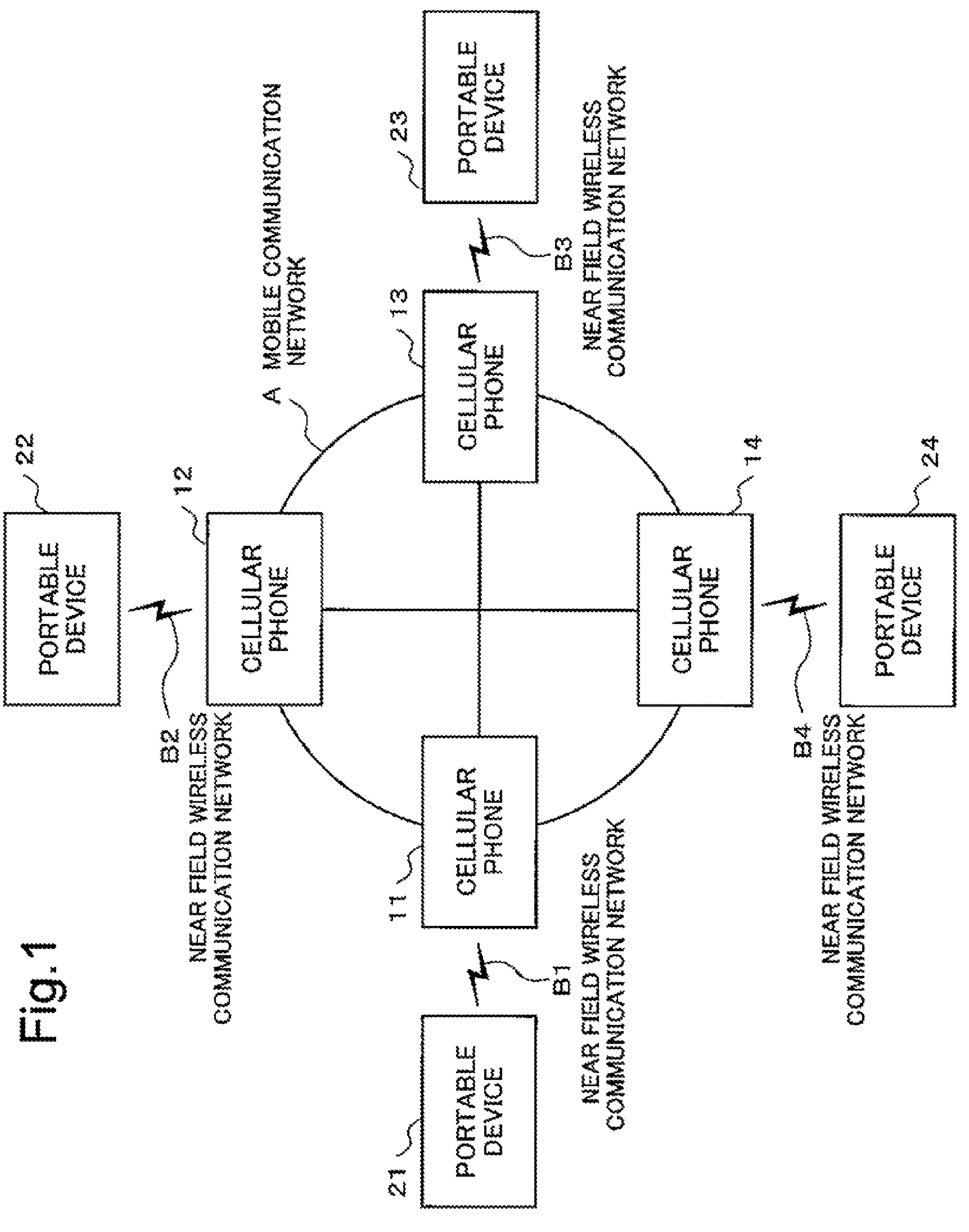
FIG. 1 shows a configuration of a whole communication system.

A communication system, which is an exemplary embodiment of the present invention, is characterized in that the communication system comprises a mobile communication terminal which has a mobile communication means for carrying out communication via a mobile communication network and a near field wireless communication means for carrying out communication via a near field wireless communication network, and a near field wireless communication terminal which has a near field communication means for carrying out communication via the near field communication network, and the mobile communication terminal comprises a communication repeating means for connecting, as a repeater, other mobile communication terminal and the near field wireless communication terminal which is connected via the near field communication network, by use of a communication path which is connected to said other mobile communication terminal via said mobile communication network.

Moreover, it may be preferable that the mobile communication terminal in the communication system includes a broadcast communication means for connecting simultaneously to a plurality of other mobile communication terminals via the mobile communication network.

Then, it may be preferable that the communication repeating means which the mobile communication terminal comprises connects, as a repeater, the other mobile terminals and the near field wireless communication terminals which are connected via the near field communication network, by use of communication paths which are connected to said other mobile communication terminals by the broadcast communication means.

Moreover, it may be preferable that the near field wireless communication terminal in the communication system includes a communication requesting means for requesting the mobile communication terminal, which is connected to the near field wireless communication terminal via the near field communication network, to connect to the other terminal. In this case, it is preferable that the communication repeating means which the mobile communication terminal comprises connects, as a repeater, the near field wireless communication terminal and said other terminal by use of the communication path which is connected to said other mobile communication terminal via said mobile communication network, in reply to a request issued by the near field wireless communication terminal.

Moreover, the communication system is characterized in that the communication repeating means which the mobile communication terminal comprises connects to other near field wireless communication terminal via the near field wireless communication network in reply to the request issued by the near field wireless communication terminal which is connected by use of the communication path which is connected to said other mobile communication terminal via said mobile communication network.

Moreover, the communication system is characterized in that the near field wireless communication means carries out near field wireless communication by use of any one of wireless LAN (Local Area Network) communication, infrared communication, Bluetooth (registered trademark) and non-contact type IC card communication.

Moreover, the communication system is characterized in that the mobile communication terminal is, for example a cellular phone.

According to the above-mentioned invention, first, the mobile communication terminal has the function to connect to the other mobile communication terminal via the mobile communication network. In this case, it may be preferable that the mobile communication terminal has the broadcast communication function to communicate simultaneously with a plurality of other mobile communication terminals. Moreover, the mobile communication terminal has also the function to communicate with the near field wireless communication terminal via the near field wireless communication network.

Then, the mobile communication terminal connects, as a repeater, other mobile communication terminals and the near field wireless communication terminals which are connected via the wireless communication network, by use of the communication paths, which are established for example by the broadcast communication function, between the mobile communication terminal and the other mobile communication terminals. As a result, the near field wireless communication terminal can realize wide area communication with the simple configuration and low cost by use of the near field wireless communication means which the near field wireless communication terminal comprises. Moreover, in the case of using the broadcast communication paths among the mobile communication terminals, it is possible to carry out wide area communication simultaneously with a plurality of terminals such as terminals which belong to a specific group.

A mobile communication terminal, which is another exemplary embodiment of the present invention, is characterized by comprising a mobile communication means for carrying out communication via a mobile communication network, and a near field wireless communication means for carrying out communication via a near field wireless communication, and by comprising a communication repeating means for connecting, as a repeater, other mobile communication terminal and a near field wireless communication terminal which is connected via the near field communication network, by use of a communication path which is connected to said other mobile communication terminal via said mobile communication network.

Moreover, the mobile communication terminal is characterized in that the mobile communication terminal includes a broadcast communication means for connecting simultaneously to a plurality of other mobile communication terminals via the mobile communication network, and the communication repeating means connects, as a repeater, the other mobile communication terminals and the near field wireless communication terminals which are connected via the near field communication network, by use of communication paths which are connected to said other mobile communication terminals by the broadcast communication means.

A program, which is another exemplary embodiment of the present invention, makes a computer of a mobile communication terminal, which comprises a mobile communication means for carrying out communication via a mobile communication network and a near field wireless communication means for carrying out communication via a near field wireless communication, execute a communication repeating procedure for connecting, as a repeating procedure, other mobile communication terminal and a near field wireless communication terminal which is connected via the near field communication network, by use of a communication path which is connected to said other mobile communication terminal via said mobile communication network.

Moreover, the program is characterized in that the program makes the computer of the mobile communication terminal furthermore execute a communication repeating procedure to connect the mobile communication terminal simultaneously to a plurality of other mobile communication terminals via the mobile communication network, and to connect, as a repeating procedure, the other mobile communication terminals and the near field wireless communication terminals which are connected via the near field communication network, by use of communication paths which are connected to said other mobile communication terminals.

A communication method, which is another exemplary embodiment of the present invention, is characterized in that a mobile communication terminal, which includes a mobile communication means for carrying out communication via a mobile communication network, and a near field wireless communication means for carrying out communication via a near field wireless communication network, the method comprising the step of, carrying out a communication repeating process to connect, as a repeating process, other mobile communication terminal and a near field wireless communication terminal which is connected via the near field communication network, by use of a communication path which is connected to said other mobile communication terminal via said mobile communication network.

Moreover, the communication method is characterized in that the method comprises the steps of, carrying out a broadcast communication process to connect the mobile communication terminal simultaneously to a plurality of other mobile communication terminals via the mobile communication network, and carrying out the communication repeating process to connect, as a repeating process, the other mobile terminals which are connected to the mobile terminal by the broadcast communication process, and the near field wireless communication terminal which is connected via the near field communication network, by use of communication paths which are connected to said other mobile communication terminals.

Since the mobile communication terminal, the program, and the communication method according to the present invention, each of which has the configuration mentioned above, work similarly to the communication system mentioned above, the mobile communication terminal, the program, and the communication method can achieve the object of the present invention.

Exemplary Embodiment

Figure 2:
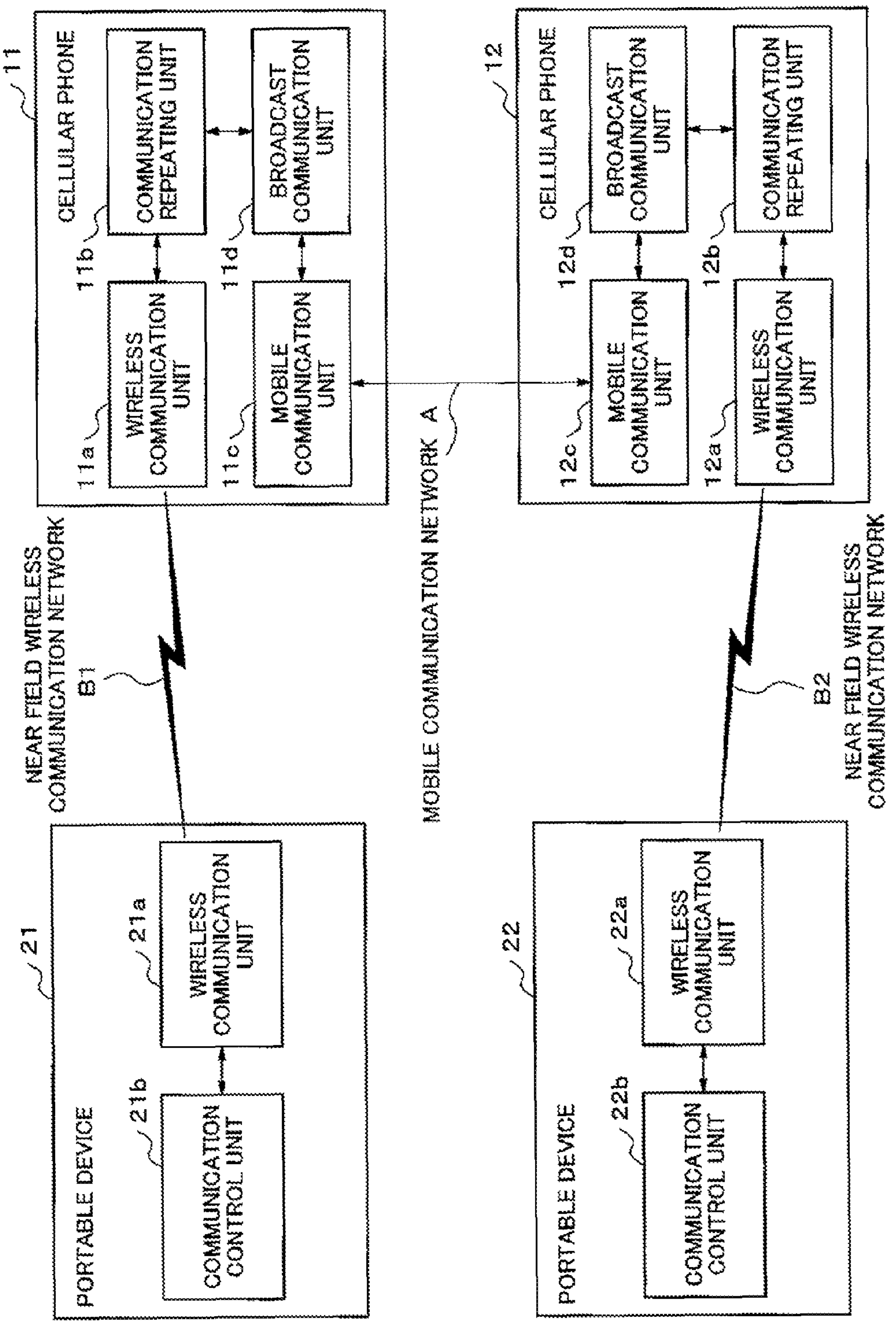
FIG. 2 is a function block diagram showing configurations of a cellular phone and a portable device.
Figure 3:
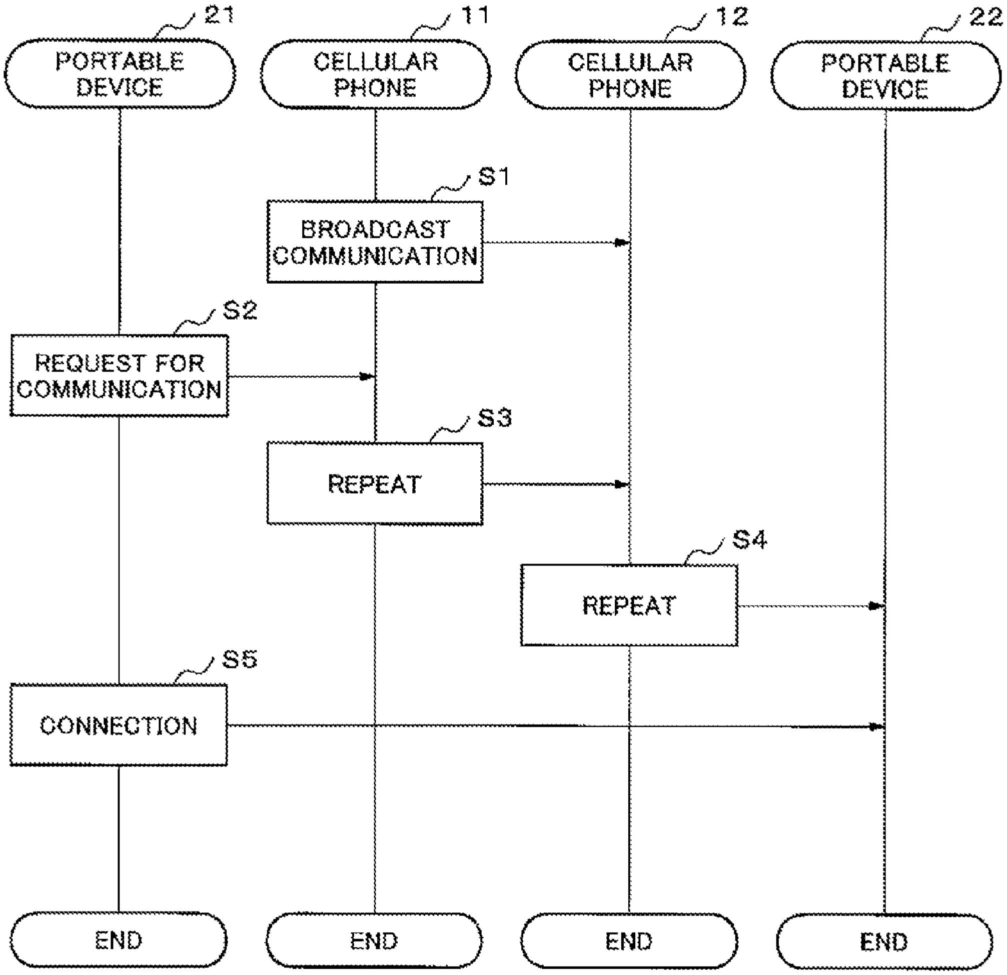
FIG. 3 is a sequence diagram showing an operation of the communication system.
Figure 4:
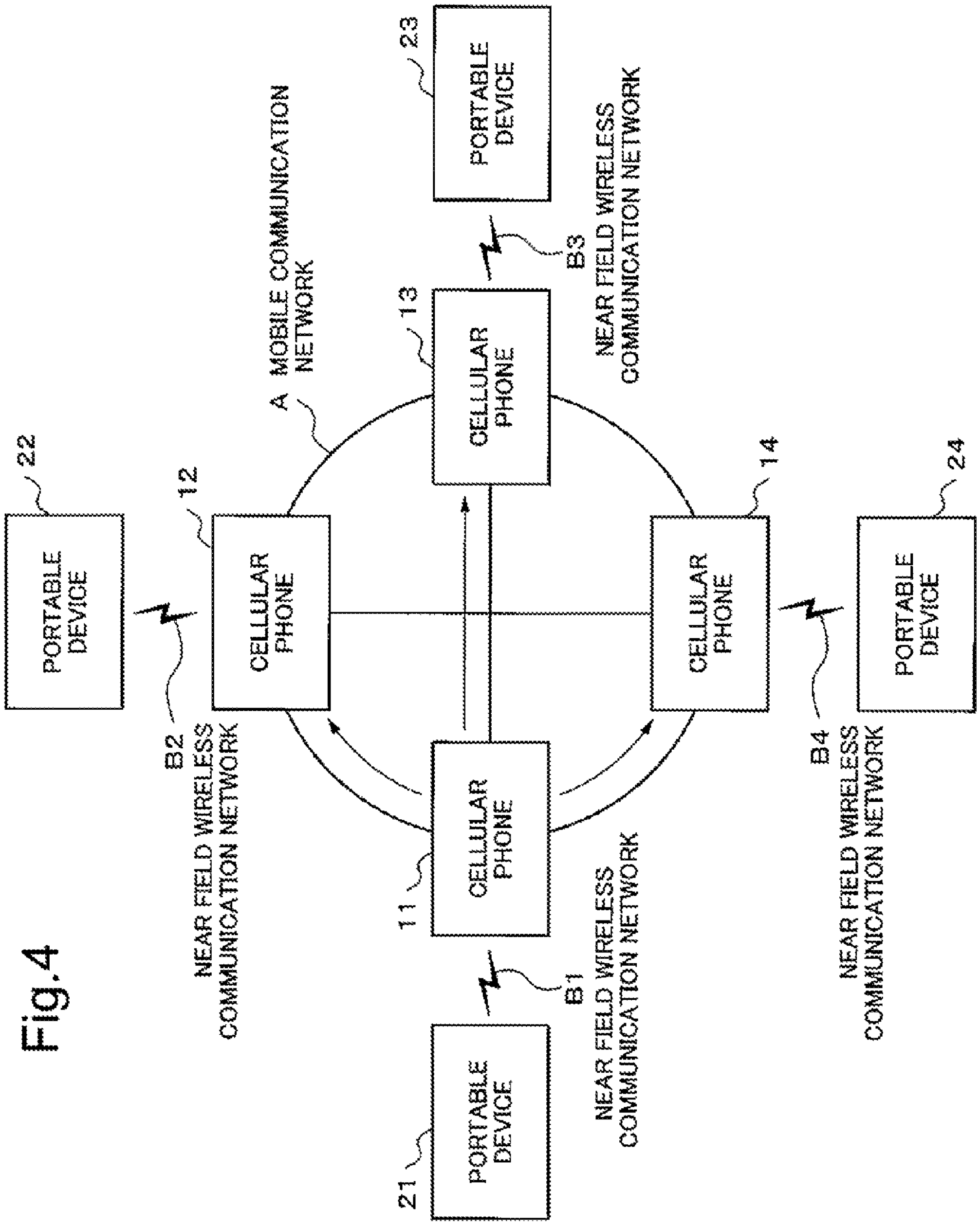
FIG. 4 is an explanatory drawing showing an operation of the communication system.
Figure 5:
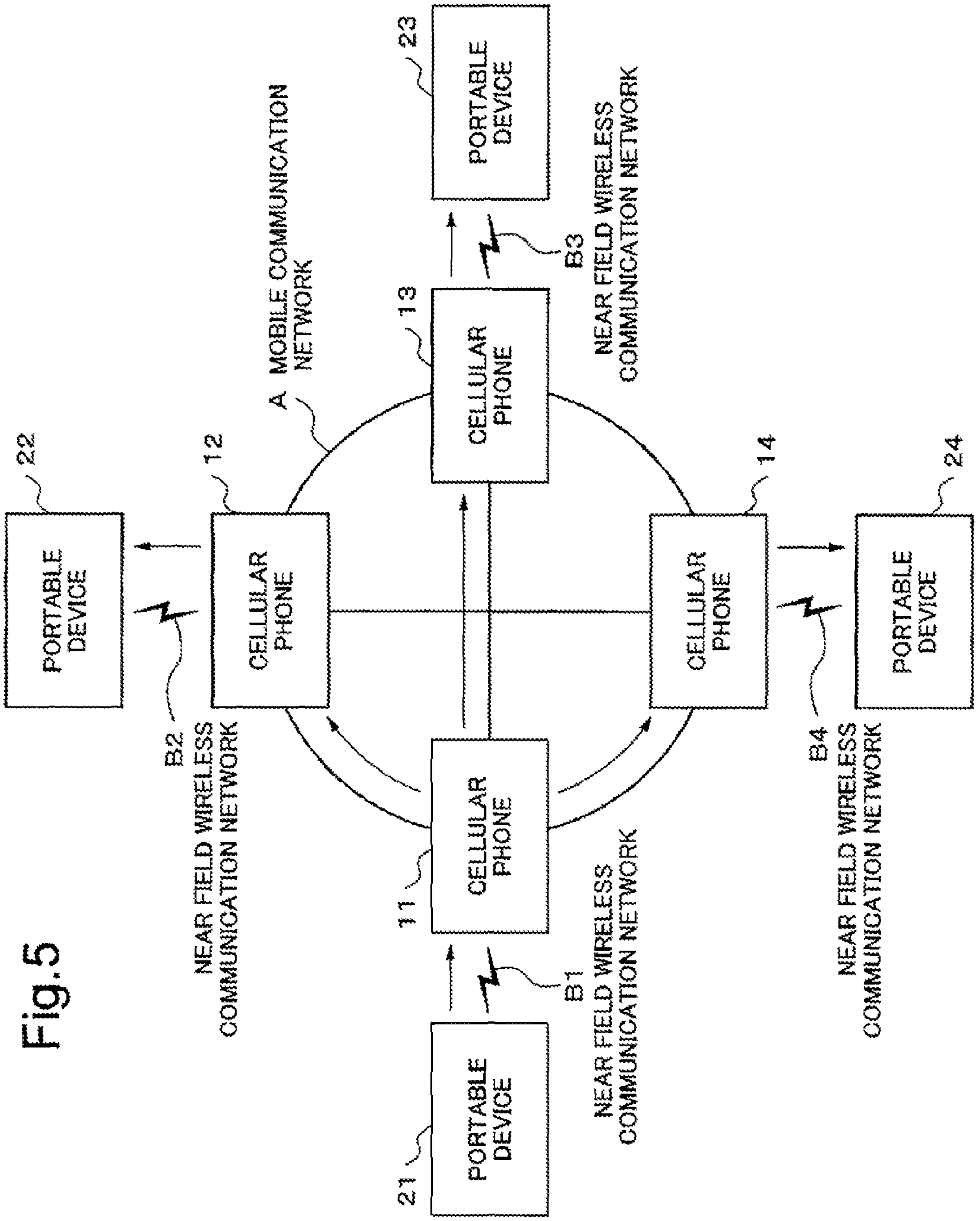
FIG. 5 is an explanatory drawing showing an operation of the communication system.

Hereinafter, exemplary embodiments of a communication system, a mobile communication terminal, a program and a communication method according to the present invention will be described with reference to FIGS. 1 to 5. FIG. 1 shows a configuration of a whole communication system. FIG. 2 is a function block diagram showing configurations of a cellular phone and a portable device. FIG. 3 is a sequence diagram showing an operation of the communication system. FIGS. 4 and 5 are explanatory drawings each of which shows an operation of the communication system.

[Configuration]

As shown in FIG. 1, the communication system according to the exemplary embodiment includes cellular phones 11, 12, 13 and 14 (mobile communication terminal) which can communicate with other cellular phone via a mobile communication network A, and portable devices 21, 22, 23 and 24 (near field wireless communication terminal) which can communicate with the cellular phones 11, 12, 13 and 14 via near field wireless communication networks B1, B2, B3 and B4 respectively. According to the exemplary embodiment, the cellular phone 11 and the portable device 21 are arranged so as to be able to carry out near field wireless communication each other. Similarly, the cellular phone 12 and the portable device 22, the cellular phone 13 and the portable device 23, and the cellular phone 14 and the portable device 24 are arranged so as to be able to carry out near field wireless communication each other. Further, while four cellular phones 11 to 14 and four portable devices 21 to 24 are shown in FIG. 1, number of the cellular phones and the portable devices arranged in the communication system is not limited to four.

Next, configurations of the mobile phone 11 or the like, and the portable device 21 or the like will be described with reference to FIG. 2. Further, while the configurations of only the cellular phones 11 and 12 and the portable devices 21 and 22 are shown in the figure, description of other cellular phones and other portable devices are omitted since the other cellular phones and the other portable devices have the same configurations respectively as the cellular phones 11 and 12 and the portable devices 21 and 22 have.

The portable device 21 according to the exemplary embodiment is an information processing terminal such as a laptop computer and PDA (Personal Digital Assistants). Moreover, the portable device 21 includes a wireless communication unit 21*a* (near field wireless communication means) which carries out communication via a near field wireless communication network such as wireless LAN (Local Area Network) communication. That is, it is possible that the portable device 21 communicates with the cellular phone 11 via the near field wireless communication network by use of the wireless communication unit 21*a*. Further, the wireless communication unit 21*a* is not limited to carrying out wireless LAN communication, and it may be preferable that the wireless communication unit 21 carries out infrared communication, Bluetooth (registered trademark), non-contact type IC card communication (communication by use of reader/writer and corresponding RFID tag) and furthermore, near field wireless communication by other kind of near field wireless communication device.

Moreover, the portable device 21 includes a communication control unit 21*b* which is realized by installation of a predetermined program in a mounted calculation unit. The communication control unit 21*b* establishes ad hoc communication with the cellular phone 11 via the near field wireless communication network B1 by use of the wireless communication unit 21*a* and controls one to one communication with the cellular phone 11. Moreover, in the case that the communication control unit 21*b* requests a connection with other portable devices 22, 23 and 24 or other mobile phones 12, 13 and 14 which are arranged outside range of the near field wireless communication, the communication control unit 21*b* has a function to request the cellular phone 11 to connect to other terminal (communication request means).

Further, since the configuration of the portable device 22 (communication control unit 22*a* and communication control unit 22*b*) shown in FIG. 2 is also identical to one of the portable device 21 mentioned above, description of the portable device 22 is omitted. Moreover, the configurations of the portable devices 23 and 24 are also identical.

Moreover, the cellular phone 11 includes a wireless communication unit 11*a* (near field wireless communication means) for carrying out near field wireless communication with the portable device 21, and a mobile communication unit 11*c* (mobile communication means) for carrying out voice communication and data communication with other mobile phones 12, 13 and 14 via the mobile communication network A. Here, the wireless communication unit 11*a* is a communication device which can communicate with the wireless communication unit 21*a* mounted on the portable device 21. The wireless communication unit 11*a* carries out, for example wireless LAN communication, infrared communication, Bluetooth (registered trademark), non-contact type IC card communication and furthermore, other near field wireless communication. Moreover, the mobile communication unit 11*c* is a communication device, which can communicate through a cellular phone network, can communicate with a base station.

Moreover, the cellular phone 11 includes a communication repeating unit 11*b* and a broadcast communication unit 11*d* which are realized by installation of a predetermined program in a mounted calculation unit. Moreover, the broadcast communication unit 11*d* (broadcast communication means) has a function to connect simultaneously to a plurality of other mobile phones 12, 13 and 14 which are grouped and registered in advance. That is, the broadcast communication unit 11*d* has the "push to talk" function to convert a voice signal to packet data and to send the packet data simultaneously to a plurality of other mobile phones 12, 13 and 14 like a transceiver. Further, since the "push to talk" function converts the voice signal into the packet data and carries out data communication, it is possible to use the communication path as a data communication path as described later.

Moreover, the communication repeating unit 11*b* (communication repeating means) has a function to connect, as a repeater, the portable device 21 which is connected to the mobile communication terminal 11 via the near field wireless communication network B1 as mentioned above, and the other cellular phones 12, 13 and 14 by use of communication paths, which are established by the push to talk function, between the cellular phone 11 and the other cellular phones 12, 13 and 14. For example, in the case that the portable device 21 has intention to connect to the other portable device 22 and establishes ad hoc communication with the cellular phone 11 on the basis of the near field wireless communication, the communication repeating unit 11*b* of the cellular phone 11 connects, as a repeater, the portable device 21 and the cellular phone 12 via a connection path, which is established by the "push to talk" function, between the cellular phone 11 and the cellular phone 12 via the mobile communication network A. Moreover, a communication repeating unit 12*b* of the cellular phone 12 connects to the portable device 22 via the near field wireless communication network B2 between the cellular phone 12 and the portable device 22, in reply to a request issued by the portable device 21 which is connected via the connecting path, which is established by the "push to talk" function, between the cellular phone 11 and the cellular phone 12 via the mobile communication network A. As a result, the portable device 21 and the portable device 22 are connected so as to be able to carry out mutual data communication.

That is, by virtue of the configuration mentioned above, the portable device 21 establishes the ad hoc communication path with the cellular phone 11 on the basis of the near field wireless communication, and similarly, the portable device 22 establishes the ad hoc communication path with the cellular phone 12 on the basis of the near field wireless communication. Moreover, since the broadcast communication path is established between the cellular phone 11 and the cellular phone 12 by the "push to talk" function, the portable device 21 and the portable device 22 are connected each other by use of the broadcast communication path. As a result, the portable device 21 can carry out data communication simultaneously with a plurality of other portable devices 22, 23 and 24 by use of the broadcast communication path and the ad hoc communication path.

Further, description of the so-called "push to talk" function mentioned above is omitted. Since the configuration of the cellular phone 12 (wireless communication unit 12*a*, mobile communication unit 12*c*, communication repeating unit 12*b* and broadcast communication unit 12*d*) shown in FIG. 2 is also identical to one of the cellular phone 11 mentioned above, description of the configuration of the cellular phone 12 is omitted. Moreover, the configurations of the other cellular phones 13 and 14 are also identical.

[Operation]

Next, an operation of the communication system will be described with reference to FIGS. 3 to 5. Here, a case that the portable device 21 carries out data communication simultaneously with other portable devices 22, 23 and 24 will be described. Further, while only an operation to connect the portable device 21 and the portable device 22 is shown in a sequence diagram of FIG. 3, an operation to connect the portable device 23 and the portable device 24 is also carried out similarly.

First, as shown by an arrow in FIG. 4, the cellular phone 11 establishes a broadcast communication path, through which the cellular phone 11 can carry out data communication with the other cellular phones 12, 13 and 14, by use of the "push to talk" function (Step S1 in FIG. 3: broadcast communication step).

Next, as shown by an arrow in FIG. 5, the portable device 21 sets up the near field wireless communication network B1, which is corresponding to an ad hoc communication path and which connects to the cellular phone 11 existing nearby, by use of the wireless LAN function. At this time, the portable device 21 requests the cellular phone 11, which is connected to the portable device 21 by use of the wireless LAN function, to connect to other portable devices 22, 23 and 24 (Step S2).

Next, in reply to the request issued by the portable device 21, the cellular phone 11 connects, as a repeater, the portable device 21, which is connected to the cellular phone 11 via the ad hoc communication path, to the cellular phones 12, 13 and 14 by use of the broadcast communication path which is established by the "push to talk" function as mentioned above and which reaches to the cellular phones 12, 13 and 14 (Step S3). Then, as shown by an arrow in FIG. 5, the cellular phones 12, 13 and 14 connect to the portable devices 22, 23 and 24 by use of the near field wireless communication networks B2, B3 and B4 respectively (Step S4). As a result, as shown in FIG. 5, each of portable devices 22, 23 and 24 is connected to the portable device 21 by use of the broadcast communication path (Step S5: communication repeating step).

Then, data received from the portable device 21 via the near field wireless communication network B1 is sent to the other cellular phones 12, 13 and 14 via the broadcast communication path which is established by the "push to talk" function as mentioned above. Afterward, the data which reaches to the cellular phones 12, 13 and 14 are transferred to the portable devices 22, 23 and 24 via the near field wireless communication networks B2, B3 and B4 respectively. Similarly, in the case that the portable devices 22, 23 and 24 send data reversely to the other cellular phone and the other portable device, data is sent by use of the ad hoc communication path based on the near field wireless communication and the broadcast communication path based on the mobile communication.

As mentioned above, according to the present invention, the portable device 21 or the like can carry out wide area communication only by use of the own wireless communication unit through the communication path to other cellular phone which is established by the cellular phone connected by the own wireless communication unit. Accordingly, the portable device 21 or the like can realize wide area communication with the simple configuration, low cost and the simple operation. In particular, it is possible to carry out the character chattering and the desktop conference with a plurality of other portable devices or the like belonging to a specific group, whose members exist in the wide area, on the basis of the so-called "push to talk" function among the cellular phones. Therefore, it is possible to improve convenience.

Further, the case that wide area communication between the portable devices is realized by use of the "push to talk" function which is established between the cellular phones has been described above. However, the method to realize wide area communication is not limited to the "push to talk" function. For example, it may be preferable that by use of one to one communication path which is established between one cellular phone and the other cellular phone, the portable devices, which are connected to the cellular phones respectively on the basis of the near field wireless communication, are connected each other. For example, it may be preferable that the broadcast communication function is realized by use of a plurality of one to one communication paths each of which is established between one cellular phone and the other cellular phone, and the portable devices, which are connected to the cellular phones respectively on the basis of the near field wireless communication, are connected each other by the broadcast communication.

While the present invention has been described with reference to the exemplary embodiment, the present invention is not limited to the exemplary embodiment. With regard to the configuration and detail of the present invention, various modifications, which are apparent to a person skilled in the art, are possible within the scope of the present invention.

The invention claimed is:

1. A communication system, comprising:

a first mobile communication terminal which includes a broadcast communication unit which functions to establish a broadcast communication path for wide area communication through a mobile communication network to simultaneously connect to a plurality of second mobile communication terminals which are grouped and registered in advance in the mobile communication network and a push to talk function to simultaneously send packet data to the plurality of second mobile communication terminals, like a transceiver, for providing a data communication path;

a first near field wireless communication terminal which includes a wireless communication unit which establishes ad hoc wireless communication to said first mobile communication terminal only within a range of near field wireless communication;

a plurality of second mobile communication terminals, each connects to the first mobile communication terminal and other second mobile communication terminals through the broadcast communication path; and a plurality of second near field wireless communication terminals, each corresponds to the second mobile communication terminals respectively and capable of carrying out ad hoc wireless communication to the corresponding second mobile communication terminal only within a range of near field wireless communication, and wherein, when said first near field wireless communication terminal sets up a first ad hoc communication path to connect to the first mobile communication terminal existing nearby through the use of the near field wireless communication with a request to connect to the second near field wireless communication terminals which are arranged outside a range of the near field wireless communication, the first mobile communication terminal responding to the request connects the first ad hoc communication path to the broadcast communication path and repeats the request to the second mobile communication terminals through the broadcast communication path, and wherein, each of the second mobile communication terminals, responding to the request received through the broadcast communication path, establishes a second ad hoc communication path to the corresponding second near field wireless communication terminal using the near field wireless communication, connects the broadcast communication path to the second ad hoc communication path, and carries out data communication among the first near field wireless communication terminal and the second near field wireless communication terminals by use of the push to talk function.

2. The communication system according to claim 1, wherein the near field wireless communication is implemented by any one of wireless Local Area Network (LAN) communication, Infrared communication, Bluetooth® and non-contact type IC card communication.

3. A mobile communication terminal which is connected to a near field wireless communication terminal which is capable of carrying out communication only within a range of near field wireless communication, comprising:

a near field communication unit which establishes an ad hoc communication path to the near field wireless communication terminal existing nearby by use of the near field wireless communication;

a broadcast communication unit which functions to establish a broadcast communication path for wide area communication through a mobile communication network to simultaneously connect to a plurality of other mobile communication terminals which are grouped and registered in advance in the mobile communication network and a push to talk function to simultaneously send packet data to the plurality of second mobile communication terminals, like a transceiver, for providing a data communication path; and a communication repeating unit which connects the ad hoc communication path and the broadcast communication path, and wherein, when the mobile communication terminal is a requesting side, the communication repeating unit repeats a connection request of the near field wireless communication terminal of the requesting side to the other mobile communication terminals of a requested side through the broadcast communication path in response to the connection request, and wherein, when the mobile communication terminal is the requested side, the communication repeating unit establishes the ad hoc communication path to the corresponding near field wireless communication terminal of the requested side in response to the connection request received through the broadcast communication path, and connects the broadcast communication path to the established ad hoc communication path, and carries out data communication among the near field wireless communication terminal of the requesting side and the near field wireless communication terminals of requested side by use of the push to talk function.

4. A method of a communication system, the method comprising:

establishing a broadcast communication path for wide area communication through a mobile communication network by a first mobile communication terminal to simultaneously connect to a plurality of second mobile communication terminals which are grouped and registered in advance in the mobile communication network;

setting up a first ad hoc communication path to the first mobile communication terminal by a first near field wireless communication terminal which is capable of carrying out communication only within a range of near field wireless communication, along with sending a request to connect to a plurality of second near field wireless communication terminals which are arranged outside a range of the near field wireless communication, each of which respectively corresponds to the second mobile communication terminals;

connecting the first ad hoc communication path to the broadcast communication path and repeating the request to the second mobile communication terminals through the broadcast communication path by the first mobile communication terminal in response to the request;

establishing a second ad hoc communication path by each of the second mobile communication terminals to the corresponding second near field wireless communication terminal using the near field wireless communication and connecting the broadcast communication path to the second ad hoc communication path in response to the request being received through the broadcast communication path; and carrying out data communication among the first near field wireless communication terminal and the second near field wireless communication terminals by use of a push to talk function which simultaneously sends packet data like a transceiver for providing a data communication path.

5. A method of a mobile communication terminal which is connected to a near field wireless communication terminal which is configured to carry out communication only within a range of near field wireless communication, the method comprising:

establishing a broadcast communication path for wide area communication through a mobile communication network in order to simultaneously connect to a plurality of other mobile communication terminals which are grouped and registered in advance in the mobile communication network;

establishing, as a requesting side, an ad hoc communication path to the near field wireless communication terminal on the basis of a request by the near field wireless communication terminal;

connecting, as the requesting side, the ad hoc communication path to the broadcast communication path when requested by the near field wireless communication terminal, and repeating a connection request of the near field wireless communication terminal to the other mobile communication terminals through the broadcast communication path;

establishing, as the requesting side, the ad hoc communication path to the near field wireless communication terminal in response to the connection request received through the broadcast communication path, and connecting the broadcast communication path to the established ad hoc communication path; and carrying out data communication among the near field wireless communication terminals corresponding to each of the mobile communication terminals of the requesting side and the requested side by use of a push to talk function which simultaneously sends packet data, like a transceiver, for providing a data communication path.

* * * * *